United States Patent
Okamoto et al.

(10) Patent No.: US 7,593,147 B2
(45) Date of Patent: Sep. 22, 2009

(54) OUTPUT APPARATUS, COLOR CONVERSION METHOD, AND MACHINE READABLE MEDIUM STORING PROGRAM

(75) Inventors: Takahiro Okamoto, Kanagawa (JP); Norimasa Shigeta, Kanagawa (JP); Shuji Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 555 days.

(21) Appl. No.: 11/135,640

(22) Filed: May 24, 2005

(65) Prior Publication Data

US 2006/0072173 A1   Apr. 6, 2006

(30) Foreign Application Priority Data

May 26, 2004   (JP) ............................. 2004-156836

(51) Int. Cl.
  G03F 3/08   (2006.01)
  G06K 9/00   (2006.01)
(52) U.S. Cl. .................. 358/518; 358/1.9; 358/519; 358/523; 382/162; 382/167
(58) Field of Classification Search ................ 345/590; 382/167, 162; 358/504, 1.9, 518, 519, 523
  See application file for complete search history.

(56) References Cited

U.S. PATENT DOCUMENTS

| | | | | |
|---|---|---|---|---|
| 6,366,291 | B1* | 4/2002 | Taniguchi et al. | 345/603 |
| 7,064,864 | B2* | 6/2006 | Takahashi et al. | 358/1.9 |
| 7,180,633 | B2* | 2/2007 | Okamoto | 358/1.9 |
| 7,274,487 | B2* | 9/2007 | Fukasawa | 358/1.9 |
| 2001/0017627 | A1* | 8/2001 | Marsden et al. | 345/501 |
| 2001/0040983 | A1* | 11/2001 | Nishikawa | 382/109 |
| 2003/0053094 | A1* | 3/2003 | Ohga et al. | 358/1.9 |
| 2003/0086104 | A1* | 5/2003 | Chen | 358/1.9 |
| 2003/0112454 | A1* | 6/2003 | Woolfe et al. | 358/1.9 |
| 2004/0061881 | A1* | 4/2004 | Shimizu et al. | 358/1.9 |
| 2004/0075852 | A1* | 4/2004 | Wang et al. | 358/1.9 |
| 2004/0109180 | A1* | 6/2004 | Braun et al. | 358/1.9 |
| 2004/0119843 | A1* | 6/2004 | Hoshuyama | 348/222.1 |
| 2004/0223173 | A1* | 11/2004 | Arai | 358/1.9 |
| 2005/0083344 | A1* | 4/2005 | Higgins | 345/600 |

FOREIGN PATENT DOCUMENTS

JP   4-180347 A   6/1992

* cited by examiner

*Primary Examiner*—Edward L Coles
*Assistant Examiner*—Charlotte M Baker
(74) *Attorney, Agent, or Firm*—Sughrue Mion, PLLC

(57) ABSTRACT

There is provided an output apparatus capable of outputting an image of high quality even if unreproducible colors are converted into reproducible colors among colors included in an image. The output apparatus, which converts unreproducible colors into reproducible colors among colors included in an image to output the image, includes a color unreproducible region extracting unit operable to extract a color unreproducible region that is a region including a color capable of not being reproduced by the output apparatus among the colors included in the image, a first color converting unit operable to convert a color of the color unreproducible region into a color capable of being reproduced by the output apparatus, and a second color converting unit operable to convert colors of regions besides the color unreproducible region based on positional relationship in the image between the color unreproducible region and the regions besides the color unreproducible region.

31 Claims, 11 Drawing Sheets

$$\begin{pmatrix} Rout \\ Gout \\ Bout \end{pmatrix} = \underbrace{\begin{pmatrix} a_{11} & a_{12} & a_{13} \\ a_{21} & a_{22} & a_{23} \\ a_{31} & a_{32} & a_{33} \end{pmatrix}}_{\text{COLOR CONVERSION MATRIX}} \begin{pmatrix} Rin \\ Gin \\ Bin \end{pmatrix}$$

OUTPUT APPARATUS, COLOR CONVERSION METHOD, AND MACHINE READABLE MEDIUM STORING PROGRAM

This patent application claims priority from Japanese Patent Application 2004-156836 filed on May 26, 2004, the content of which is incorporated herein by reference.

BACKGROUND OF THE INVENTION

1. Field of the Invention

The present invention relates to an image output apparatus, a color conversion method, and a machine readable medium storing a program. More particularly, the present invention relates to an image output apparatus that converts unreproducible colors into reproducible colors among colors contained in an image to output the image, a color conversion method performed by the output apparatus, and a machine readable medium storing a program used for the output apparatus.

2. Description of Related Art

According to an image output apparatus processing an image signal to output an image, there is no problem when outputting image signals within a color reproduction region of the output apparatus. However, image quality deteriorates by the break of color when outputting image signals outside the color reproduction region of the output apparatus. Therefore, in order to solve this problem, an image processing method for converting the image signals outside the color reproduction region of the image output apparatus into the image signals within the color reproduction region is known as disclosed, for example, in Japanese Patent Application Laid-Open No. 4-180347.

According to the image processing method disclosed in Japanese Patent Application Laid-Open No. 4-180347, image signals of all colors capable of being displayed by an input image are collectively converted into image signals within the color reproduction region of the output apparatus. Therefore, the image signals within the color reproduction region of the output apparatus are also converted equally and, thus, the input image cannot accurately be reproduced.

SUMMARY OF THE INVENTION

Therefore, it is an object of the present invention to provide an output apparatus, a color conversion method, and a machine readable medium storing a program that can solve the foregoing problems. The above and other objects can be achieved by combinations described in the independent claims. The dependent claims define further advantageous and exemplary combinations of the present invention.

According to the first aspect of the present invention, there is provided an output apparatus that converts unreproducible colors into reproducible colors among colors included in an image to output the image. The output apparatus includes: a color unreproducible region extracting unit operable to extract a color unreproducible region that is a region including a color capable of not being reproduced by the output apparatus among the colors included in the image; a first color converting unit operable to convert a color of the color unreproducible region into a color capable of being reproduced by the output apparatus; and a second color converting unit operable to convert colors of regions besides the color unreproducible region based on positional relationship in the image between the color unreproducible region and the regions besides the color unreproducible region.

The color unreproducible region extracting unit may extract the color unreproducible region that is a region including a color outside a Gamut region showing colors capable of being reproduced by the output apparatus among the colors included in the image, and the first color converting unit may convert the color of the color unreproducible region into the color within the Gamut region.

The second color converting unit may convert the colors of the regions besides the color unreproducible region based on the distance in the image to the color unreproducible region.

The second color converting unit may perform color conversion closer to the color conversion performed on the color unreproducible region by means of the first color converting unit with respect to the colors of the regions besides the color unreproducible region closer to the color unreproducible region in the image.

The first color converting unit may generate a gamma curve by which the color of the color unreproducible region is converted into the color capable of being reproduced by the output apparatus to gamma-convert the color of the color unreproducible region, and the second color converting unit may generate a plurality of gamma curves that is used for the color conversion of the regions besides the color unreproducible region to respectively gamma-convert the colors of the regions besides the color unreproducible region based on the distance in the image to the color unreproducible region.

The second color converting unit may generate the gamma curves closer to the gamma curve generated by the first color converting unit to respectively gamma-convert the colors of the regions besides the color unreproducible region with respect to the regions besides the color unreproducible region closer to the color unreproducible region in the image.

The color unreproducible region extracting unit may extract a object including a color capable of not being reproduced by the output apparatus as the color unreproducible region, the first color converting unit may convert the color of the object into a reproducible color, and the second color converting unit may respectively gamma-convert colors of objects besides the object based on the distance in the image to the object.

The first color converting unit may generate a lookup table by which the color of the color unreproducible region is converted into the color capable of being reproduced by the output apparatus to convert the color of the color unreproducible region, and the second color converting unit may generate a plurality of lookup tables that is used for the color conversion of the regions besides the color unreproducible region to respectively convert the colors of the regions besides the color unreproducible region based on the distances in the image between the color unreproducible region and the regions besides the color unreproducible region.

The second color converting unit may generate the lookup tables closer to the lookup table generated by the first color converting unit with respect to the regions besides the color unreproducible region closer to the color unreproducible region in the image and also generate the lookup tables having small color conversion with respect to the regions besides the color unreproducible region farther from the color unreproducible region in the image, in order to respectively convert the colors of the regions besides the color unreproducible region.

The first color converting unit may generate a color conversion matrix by which the color of the color unreproducible region is converted into the color capable of being reproduced by the output apparatus to convert the color of the color unreproducible region, and the second color converting unit may generate a plurality of color conversion matrices that is used for the color conversion of the regions besides the color unreproducible region to respectively convert the colors of the regions besides the color unreproducible region based on the distances in the image between the color unreproducible region and the regions besides the color unreproducible region.

The second color converting unit may generate the color conversion matrices closer to the color conversion matrix generated by the first color converting unit with respect to the regions besides the color unreproducible region closer to the color unreproducible region in the image and also generate the color conversion matrices having small color conversion with respect to the regions besides the color unreproducible region farther from the color unreproducible region in the image, in order to respectively convert the colors of the regions besides the color unreproducible region.

The color unreproducible region extracting unit may extract the color unreproducible region consisting of a single color capable of not being reproduced by the output apparatus, the first color converting unit may convert the color of the color unreproducible region into the color capable of being reproduced by the output apparatus, and the second color converting unit may convert the colors of the regions close to the color unreproducible region in the image in accordance with the color conversion by the first color converting unit.

The second color converting unit may convert the color of the region that is a region close to the color unreproducible region in the image and is a color close to the color of the color unreproducible region that has been converted by the first color converting unit in a color space in accordance with the color conversion by the first color converting unit.

The first color converting unit may perform color conversion indicated by a first conversion vector in the color space with respect to the color unreproducible region, and the second color converting unit may perform color conversion indicated by a second conversion vector having the same direction as the first conversion vector in the color space with respect to the region close to the color unreproducible region in the image.

The second color converting unit may respectively perform color conversion indicated by the second conversion vector having the magnitude according to the distance from the color unreproducible region in the image with respect to the regions close to the color unreproducible region in the image.

The second color converting unit may perform color conversion indicated by the second conversion vector having the magnitude closer to the first conversion vector with respect to the region closer to the color unreproducible region in the image.

The second color converting unit may respectively perform color conversion indicated by the second conversion vector having the magnitude according to the distance in the color space between the color of the region close to the color unreproducible region in the image and the color of the color unreproducible region that has been converted by the first color converting unit with respect to the regions close to the color unreproducible region in the image.

The second color converting unit may respectively perform color conversion indicated by the second conversion vector having the magnitude closer to the first conversion vector with respect to the region that is close to the color unreproducible region in the image and of which a color is closer to the color of the color unreproducible region that has been converted by the first color converting unit in the color space.

The second color converting unit may convert a color of the region close to the region that has been converted by the second color converting unit in the image according to the color conversion performed on the region that has been converted by the second color converting unit.

The color unreproducible region extracting unit may extract the color unreproducible region consisting of a plurality of colors capable of not being reproduced by the output apparatus, and the first color converting unit may convert the plurality of colors of the color unreproducible region into reproducible colors according to an area of the color unreproducible region in the image.

The first color converting unit may convert the plurality of colors of the color unreproducible region so that the distance in the color space between the plurality of colors of the color unreproducible region after the color conversion turns to be smaller than the distance in the color space before the color conversion when an area of the color unreproducible region is small.

The second color converting unit may convert the color of the region adjacent to the color unreproducible region based on the distance in the color space between the color of the color unreproducible region and the color of the region adjacent to the color unreproducible region.

The second color converting unit may perform color conversion closer to the color conversion performed on the color unreproducible region by the first color converting unit with respect to the color of the region adjacent to the color unreproducible region when the distance in the color space between the color of the color unreproducible region and the color of the region adjacent to the color unreproducible region is small, and also perform small color conversion with respect to the regions besides the color unreproducible region when the distance in the color space between the color of the color unreproducible region and the color of the region adjacent to the color unreproducible region is large.

According to the second aspect of the present invention, there is provided a color conversion method of converting unreproducible colors into reproducible colors among colors included in an image. The color conversion method includes the steps of: extracting a color unreproducible region that is a region including a color capable of not being reproduced by an output apparatus among the colors included in the image; converting a color of the color unreproducible region into a color capable of being reproduced by the output apparatus; and converting colors of regions besides the color unreproducible region based on positional relationship in the image between the color unreproducible region and the regions besides the color unreproducible region.

According to the third aspect of the present invention, there is provided a machine readable medium storing a program for an output apparatus that converts unreproducible colors into reproducible colors among colors included in an image to output the image. The program causes the output apparatus to function as: a color unreproducible region extracting unit operable to extract a color unreproducible region that is a region including a color capable of not being reproduced by the output apparatus among the colors included in the image; a first color converting unit operable to convert a color of the color unreproducible region into a color capable of being reproduced by the output apparatus; and a second color converting unit operable to convert colors of regions besides the color unreproducible region based on positional relationship in the image between the color unreproducible region and the regions besides the color unreproducible region.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which:

FIG. 5 is a view showing the first example of a color conversion method of an image by the output apparatus;

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
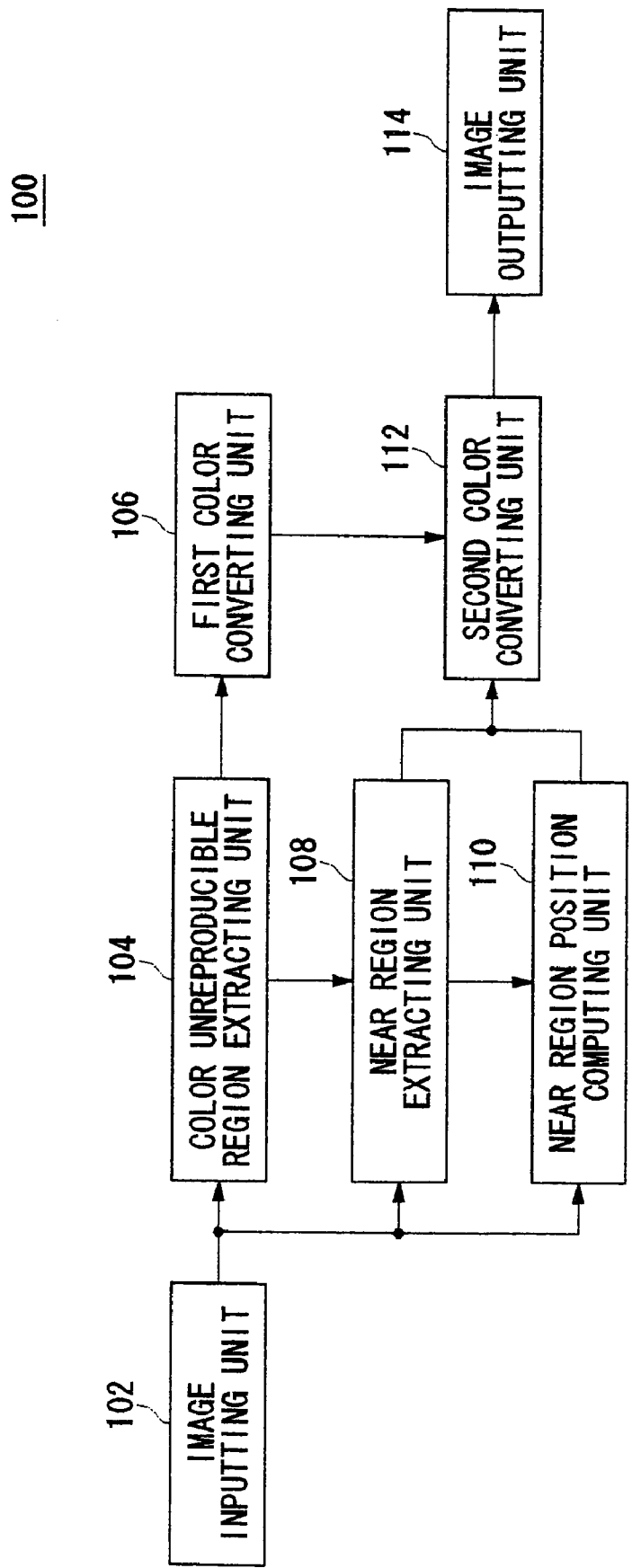
FIG. 1 is a view exemplary showing a block configuration of an output apparatus.

FIG. 1 is a view exemplary showing a block configuration of an output apparatus 100 according to an embodiment of the present invention. The output apparatus 100 may be a display unit displaying an image on a display device, or may be a print unit printing an image on a medium. For example, the output apparatus 100 is a television image receiving device, a monitor, a printer, a processing laboratory equipment, and so on. Moreover, the output apparatus 100 may include an information processor such as a computer and an output apparatus such as a monitor or a printer.

The object of the output apparatus 100 according to the present embodiment is to convert a color of an unreproducible region that is a region including an unreproducible color into a reproducible color among colors included in an image and further convert colors of regions besides the color unreproducible region according to positional relationship to the color unreproducible region in the image in order to output an image true to the input image to a maximum extent within the color reproducible region of the output apparatus 100.

The output apparatus 100 includes an image inputting unit 102, a color unreproducible region extracting unit 104, a first color converting unit 106, a adjacent region extracting unit 108, a adjacent region position computing unit 110, a second color converting unit 112, and an image outputting unit 114.

The image inputting unit 102 inputs an image from outside. The image inputting unit 102 may be a network interface that inputs an image via a network, may be a drive that reads an image from a recording medium such as a DVD and inputs the image, or may be an antenna that receives television broadcasting services.

The color unreproducible region extracting unit 104 extracts a color unreproducible region that is a region including colors capable of not being reproduced by the output apparatus 100 among colors included in an image input by the image inputting unit 102. Here, the colors capable of not being reproduced by the output apparatus 100 may be colors outside a Gamut region showing the colors capable of being reproduced by the output apparatus 100. That is, the color unreproducible region extracting unit 104 extracts the color unreproducible region that is a region including colors outside the Gamut region showing colors capable of being reproduced by the output apparatus 100 among colors included in an image. Moreover, the colors capable of not being reproduced by the output apparatus 100 may be colors that the output apparatus 100 cannot reproduce due to ambient light as recognized by a user. That is, the color unreproducible region extracting unit 104 may extract the color unreproducible region that is a region including the colors capable of not being reproduced by the output apparatus 100 as recognized by the user among the colors included in the image based on a measurement result of an amount of ambient light in the vicinity of the output apparatus 100.

The adjacent region extracting unit 108 extracts a region adjacent to the color unreproducible region extracted by the color unreproducible region extracting unit 104. Moreover, the adjacent region position computing unit 110 computes positional relationship in the image between the color unreproducible region extracted by the color unreproducible region extracting unit 104 and the region adjacent to the color unreproducible region extracted by the adjacent region extracting unit 108. Particularly, the adjacent region position computing unit 110 computes the distance in the image between the color unreproducible region extracted by the color unreproducible region extracting unit 104 and the region adjacent to the color unreproducible region extracted by the adjacent region extracting unit 108.

The first color converting unit 106 converts the color of the color unreproducible region extracted by the color unreproducible region extracting unit 104 into the color capable of being reproduced by the output apparatus 100 in relation to the image input by the image inputting unit 102. For example, the first color converting unit 106 converts the color within the color unreproducible region into the color within the Gamut region.

The second color converting unit 112 converts the colors outside the color unreproducible region based on the positional relationship in the image between the color unreproducible region computed by the adjacent region position computing unit 110 and the region besides the color unreproducible region in relation to the image input by the image inputting unit 102. Particularly, the second color converting unit 112 converts the colors outside the color unreproducible region based on the distance in the image to the color unreproducible region, which is computed by the adjacent region position computing unit 110. For example, the second color converting unit 112 performs color conversion closer to the color conversion performed on the color unreproducible region by means of the first color converting unit 106 with respect to the colors of the regions besides the color unreproducible region closer to the color unreproducible region in the image.

The image outputting unit 114 performs the color conversion on the color unreproducible region by means of the color converting unit 106, and outputs the image in which the color conversion is performed on the region besides the color unreproducible region by means of the second color converting unit 112. The image outputting unit 114 may display the image on a display device, or may print the image on a medium.

According to the output apparatus 100 of the present embodiment, since the colors outside the color unreproducible region are converted according to the distance to the color unreproducible region in the image, it is possible to prevent the break of color in the region close to the color unreproducible region and to accurately reproduce the colors of the input image in the region far from the color unreproducible region.

Figure 2:
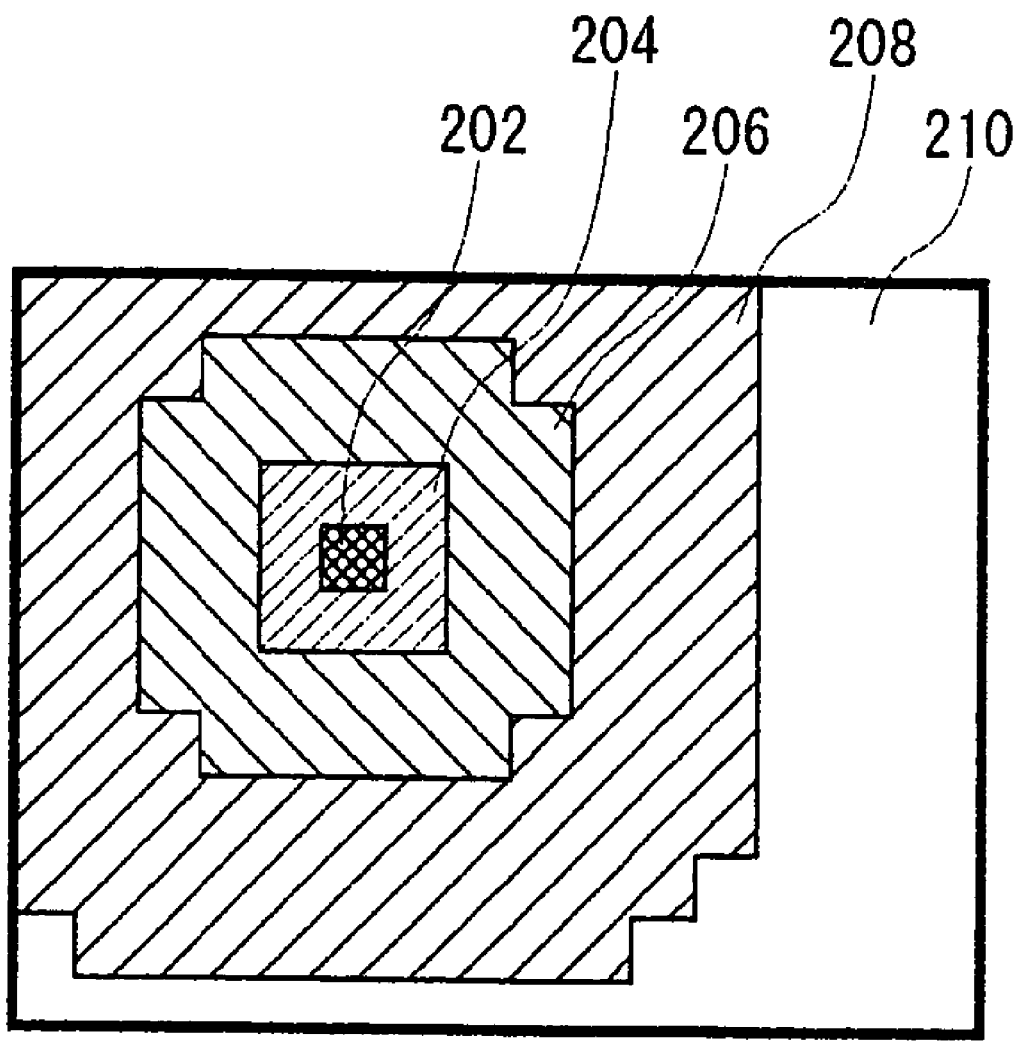
FIG. 2 is a view showing the first example of a color conversion method of an image by the output apparatus.
Figure 3:
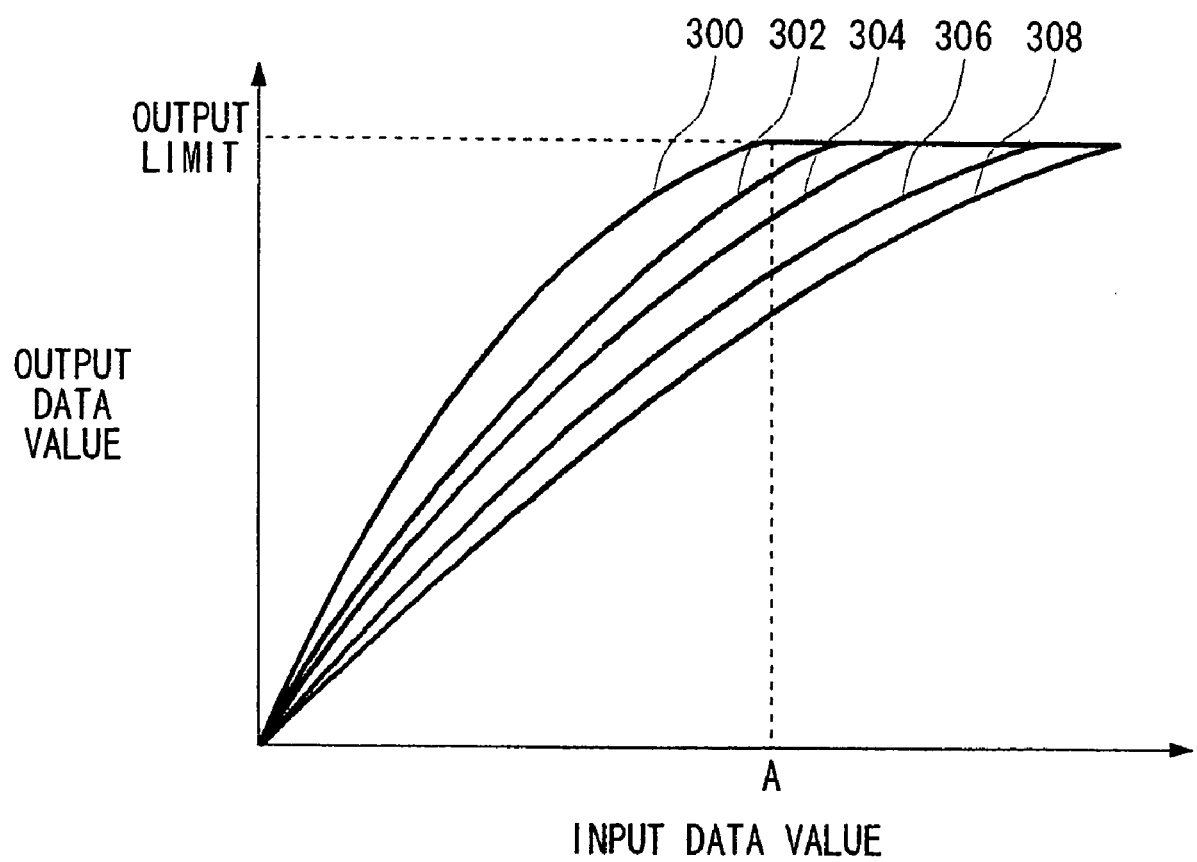
FIG. 3 is a view showing the first example of a color conversion method of an image by the output apparatus.
Figure 4:
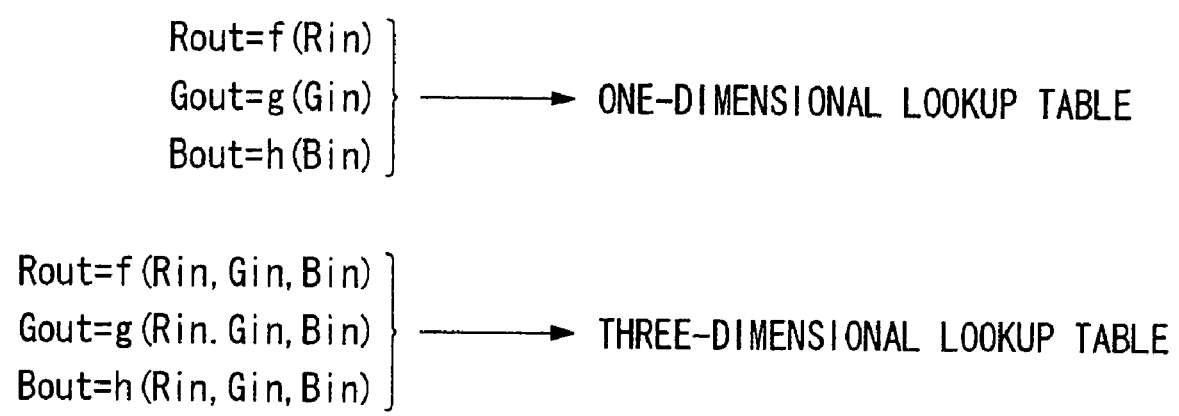
FIG. 4 is a view showing the first example of a color conversion method of an image by the output apparatus.

FIGS. 2 and 3 show the first example of a color conversion method of an image performed by the output apparatus 100 according to the present embodiment. FIG. 2 is a view exemplary showing an image 200 according to the first example. FIG. 3 is a view exemplary showing a gamma curve used by the output apparatus 100 according to the first example. FIG. 4 is a view exemplary showing a lookup table used by the output apparatus 100 according to the first example. FIG. 5 is a view exemplary showing a color conversion matrix used by the output apparatus 100 according to the first example.

As shown in FIG. 2, the image 200 input by the image inputting unit 102 includes a color unreproducible region 202 that is a region including the colors capable of not being reproduced by the output apparatus 100, a region 204 adjacent to the color unreproducible region 202, a region 206 adjacent to the region 204, a region 208 adjacent to the region 206, and a region 210 adjacent to the region 208. These region 204, region 206, region 208, and region 210 are close to the color unreproducible region 202 in the image 200 in this order.

As shown in FIG. 3, the output apparatus 100 gamma-converts each color of the color unreproducible region 202, the region 204, the region 206, the region 208, and the region 210 using each of a gamma curve 308, a gamma curve 306, a gamma curve 304, a gamma curve 302, and a gamma curve 300. In addition, when the colors capable of not being reproduced by the output apparatus 100 are not included in the image 200, the output apparatus 100 converts input data values into output data values using the gamma curve 300. That is, the colors capable of not being reproduced by the output apparatus 100 of the present embodiment are colors having the input data value more than A, which can not be reproduced by the gamma curve 300 usually used by the output apparatus 100.

Hereinafter, the color conversion method will be described referring to FIGS. 2 and 3. The color unreproducible region extracting unit 104 extracts the color unreproducible region 202 that is a region including the colors capable of not being reproduced by the output apparatus 100 among the colors included in the image 200 input by the image inputting unit 102. Then, the first color converting unit 106 converts the color of the color unreproducible region 202 into the color capable of being reproduced by the output apparatus 100. For example, the first color converting unit 106 generates the gamma curve 308 for converting the color of the color unreproducible region 202 into the color capable of being reproduced by the output apparatus 100 to gamma-convert the color of the color unreproducible region 202.

Next, the adjacent region extracting unit 108 extracts the region 204 adjacent to the color unreproducible region 202 in the image 200. Then, the adjacent region position computing unit 110 computes the distance in the image 200 between the color unreproducible region 202 and the region 204. Then, the second color converting unit 112 generates the gamma curve 306 to gamma-convert the color of the region 204 based on the distance in the image 200 between the color unreproducible region 202 and the region 204.

Furthermore, the adjacent region extracting unit 108 extracts the region 206 adjacent to the region 204 in the image 200. Then, the adjacent region position computing unit 110 computes the distance in the image 200 between the color unreproducible region 202 and the region 206. Then, the second color converting unit 112 generates the gamma curve 304 to gamma-convert the color of the region 206 based on the distance in the image 200 between the color unreproducible region 202 and the region 206.

Furthermore, the adjacent region extracting unit 108 extracts the region 208 adjacent to the region 206 in the image 200. Then, the adjacent region position computing unit 110 computes the distance in the image 200 between the color unreproducible region 202 and the region 208. Then, the second color converting unit 112 generates the gamma curve 302 to gamma-convert the color of the region 208 based on the distance in the image 200 between the color unreproducible region 202 and the region 208.

Furthermore, the adjacent region extracting unit 108 extracts the region 210 adjacent to the region 208 in the image 200. Then, the adjacent region position computing unit 110 computes the distance in the image 200 between the color unreproducible region 202 and the region 210. Then, the second color converting unit 112 generates the gamma curve 300 to gamma-convert the color of the region 210 based on the distance in the image 200 between the color unreproducible region 202 and the region 210.

The second color converting unit 112 generates a plurality of gamma curves that is used for color conversion of the regions besides the color unreproducible region 202 to respectively gamma-convert the colors of the regions besides the color unreproducible region 202 based on the distance from the color unreproducible region 202 in the image 200. In this case, the second color converting unit 112 generates the gamma curves closer to the gamma curve 308 generated by the first color converting unit 106 to respectively gamma-convert the colors of the regions besides the color unreproducible region 202 with respect to the regions besides the color unreproducible region 202 closer to the color unreproducible region 202 in the image 200.

As described above, since the gamma curves are gradually changed according to the distance from the color unreproducible region 202, it is possible to prevent unnatural colors out of focus due to the difference of the gamma curves. Moreover, since the gamma curves are gradually raised according to the distance from the color unreproducible region 202, the output apparatus 100 can perform color conversion using the most suitable gamma curves in the regions far from the color unreproducible region 202.

In addition, when the image 200 includes a plurality of color unreproducible regions, the color conversion is performed on the whole of the image 200 with regard to the first color unreproducible region, and then the color conversion is performed on the whole of the image 200 with regard to the second color unreproducible region. The color conversion may be repeated until the colors capable of not being reproduced by the output apparatus 100 are not present any more in the image 200. Moreover, in another example, after generating a plurality of gamma curves for converting the color of each region as described above with regard to the plurality of color unreproducible regions, the color conversion may be performed by mixing the plurality of gamma curves for each region to generate one gamma curve for each region.

Moreover, as shown in FIG. 4, the output apparatus 100 may generate an one-dimensional lookup table or a three-dimensional lookup table from an one-dimensional color conversion function or a three-dimensional color conversion function in order to convert the color of each of the color unreproducible region 202, the region 204, the region 206, the region 208, and the region 210.

Hereinafter, the color conversion method will be described referring to FIGS. 2 and 4. The first color converting unit 106 generates a lookup table, which converts the color of the color unreproducible region 202 into the color capable of reproduced by the output apparatus 100, to convert the color of the color unreproducible region 202. Then, the second color converting unit 112 generates a plurality of lookup tables, which is used for color conversion of the region 204, the region 206, the region 208, and the region 210 besides the color unreproducible region 202, to respectively convert the colors of the region 204, the region 206, the region 208, and the region 210 besides the color unreproducible region 202 based on the distances in the image between the color unreproducible region 202 and each of the region 204, the region 206, the region 208, and the region 210 besides the color unreproducible region 202.

The second color converting unit 112 generates the lookup tables closer to the lookup table generated by the first color converting unit 106 with respect to the regions besides the color unreproducible region 202 closer to the color unreproducible region 202 in the image. Moreover, the second color converting unit 112 generates the lookup tables having small color conversion to respectively convert the colors of the regions besides the color unreproducible region 202 with respect to the regions besides the color unreproducible region 202 farther from the color unreproducible region 202 in the image.

As described above, since the lookup tables are gradually changed according to the distance from the color unreproducible region 202, it is possible to prevent unnatural colors out of focus due to the difference of the lookup tables. Moreover, since the degree of color conversion by the lookup tables is gradually reduced according to the distance from the color unreproducible region 202, it is possible to accurately reproduce an original color of the image in the regions far from the color unreproducible region 202.

Moreover, as shown in FIG. 5, the output apparatus 100 may generate a color conversion matrix to convert the color of each of the color unreproducible region 202, the region 204, the region 206, the region 208, and the region 210.

Hereinafter, the color conversion method will be described referring to FIGS. 2 and 5. The first color converting unit 106 generates a color conversion matrix, which converts the color of the color unreproducible region 202 into the color capable of reproduced by the output apparatus 100, to convert the color of the color unreproducible region 202. Then, the second color converting unit 112 generates a plurality of color conversion matrices, which is used for color conversion of the region 204, the region 206, the region 208, and the region 210 besides the color unreproducible region 202, to respectively convert the colors of the region 204, the region 206, the region 208, and the region 210 besides the color unreproducible region 202 based on the distances in the image between the color unreproducible region 202 and each of the region 204, the region 206, the region 208, and the region 210 besides the color unreproducible region 202.

The second color converting unit 112 generates the color conversion matrices closer to the color conversion matrix generated by the first color converting unit 106 with respect to the regions besides the color unreproducible region 202 closer to the color unreproducible region 202 in the image. Moreover, the second color converting unit 112 generates the color conversion matrices having small color conversion to respectively convert the colors of the regions besides the color unreproducible region 202 with respect to the regions besides the color unreproducible region 202 farther from the color unreproducible region 202 in the image. For example, it is preferable that the second color converting unit 112 brings the color conversion matrix close to a unit matrix as the distance in the image to the color unreproducible region 202 becomes more distant.

As described above, since the color conversion matrices are gradually changed according to the distance from the color unreproducible region 202, it is possible to prevent unnatural colors out of focus due to the difference of the color conversion matrices. Moreover, since the degree of color conversion by the color conversion matrices is gradually reduced according to the distance from the color unreproducible region 202, it is possible to accurately reproduce an original color of the image in the regions far from the color unreproducible region 202.

Figure 6:
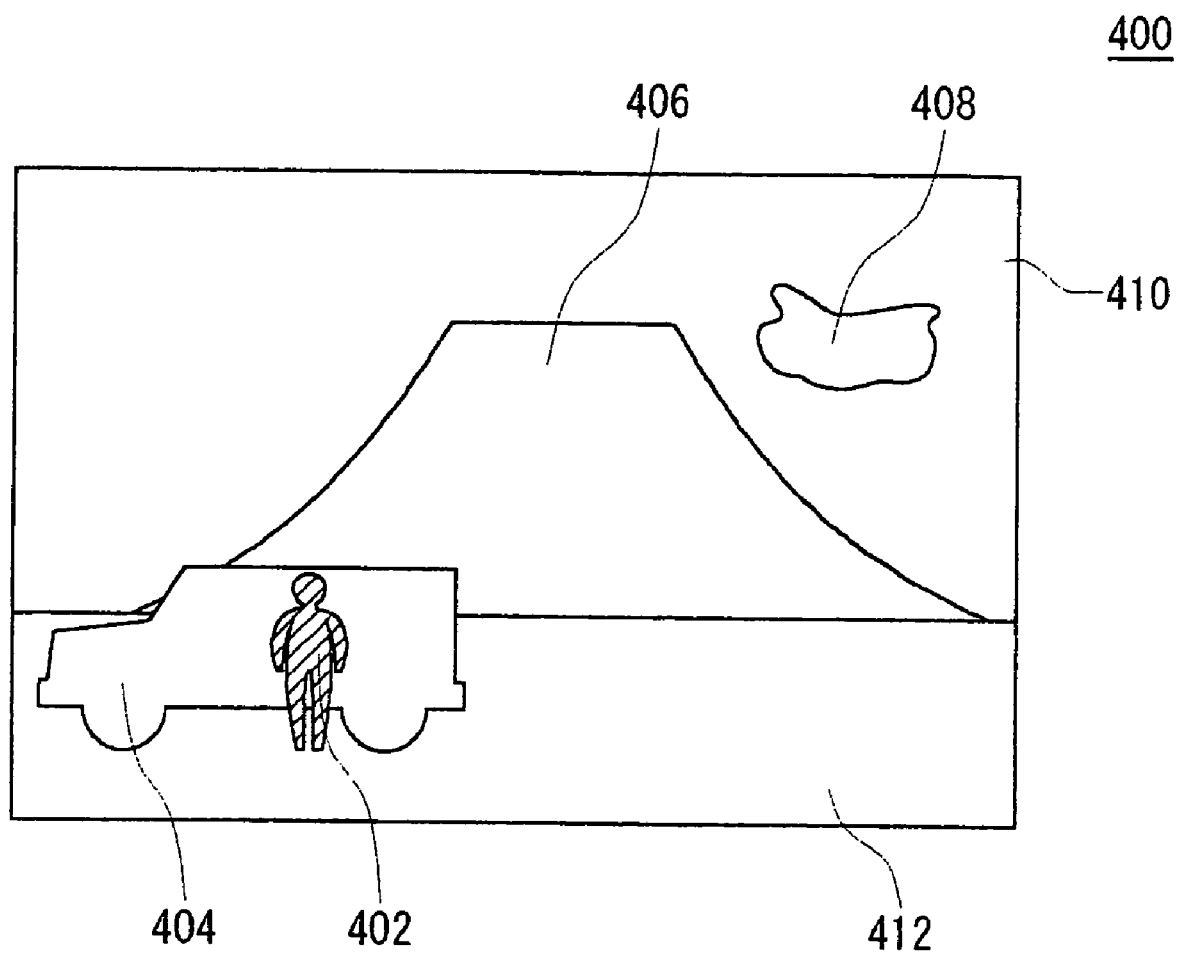
FIG. 6 is a view showing the second example of a color conversion method of an image by the output apparatus.

FIG. 6 shows the second example of the color conversion method of the image by the output apparatus 100 according to the present embodiment. According to the first example of the color conversion method shown in FIGS. 2 to 5, although the output apparatus 100 generates the gamma curves, the lookup tables, and the color conversion matrices to perform the color conversion for each region at a predetermined distance from the color unreproducible region, the output apparatus 100 may generate the gamma curves, the lookup tables, and the color conversion matrices to perform the color conversion for each object corresponding to the region in the image. In addition, except for the following description, since an operation of the output apparatus 100 according to the second example is similar to an operation of the output apparatus 100 according to the first example, their descriptions will be omitted.

The color unreproducible region extracting unit 104 extracts an object 402 including a color capable of not being reproduced by the output apparatus 100 among colors included in an image 400 input by the image inputting unit 102 as a color unreproducible region. Then, the first color converting unit 106 converts the color of the object 402 into the color capable being reproduced by the output apparatus 100. For example, the first color converting unit 106 generates the gamma curves, the lookup tables, and the color conversion matrices that convert the color of the object 402 into the color capable being reproduced by the output apparatus 100 in order to convert the color of the object 402.

Next, the adjacent region extracting unit 108 extracts objects 404, 406, 408, 410, and 412 besides the object 402 in the image 400. Then, the adjacent region position computing unit 110 computes the distances in the image 400 between the object 402 and each of the objects 404, 406, 408, 410, and 412. Then, the second color converting unit 112 generates the gamma curves, the lookup tables, and the color conversion matrices that are used for the color conversion of the objects 404, 406, 408, 410, and 412 besides the object 402 in order to respectively convert the colors of the objects 404, 406, 408, 410, and 412 besides the object 402 based on the distances in the image 400 between the object 402 and each of the objects 404, 406, 408, 410, and 412.

As described above, since the same color conversion is performed within the object by generating the gamma curves, the lookup tables, and the color conversion matrices for each object, it is possible to prevent unnatural colors out of focus within the object.

Figure 7:
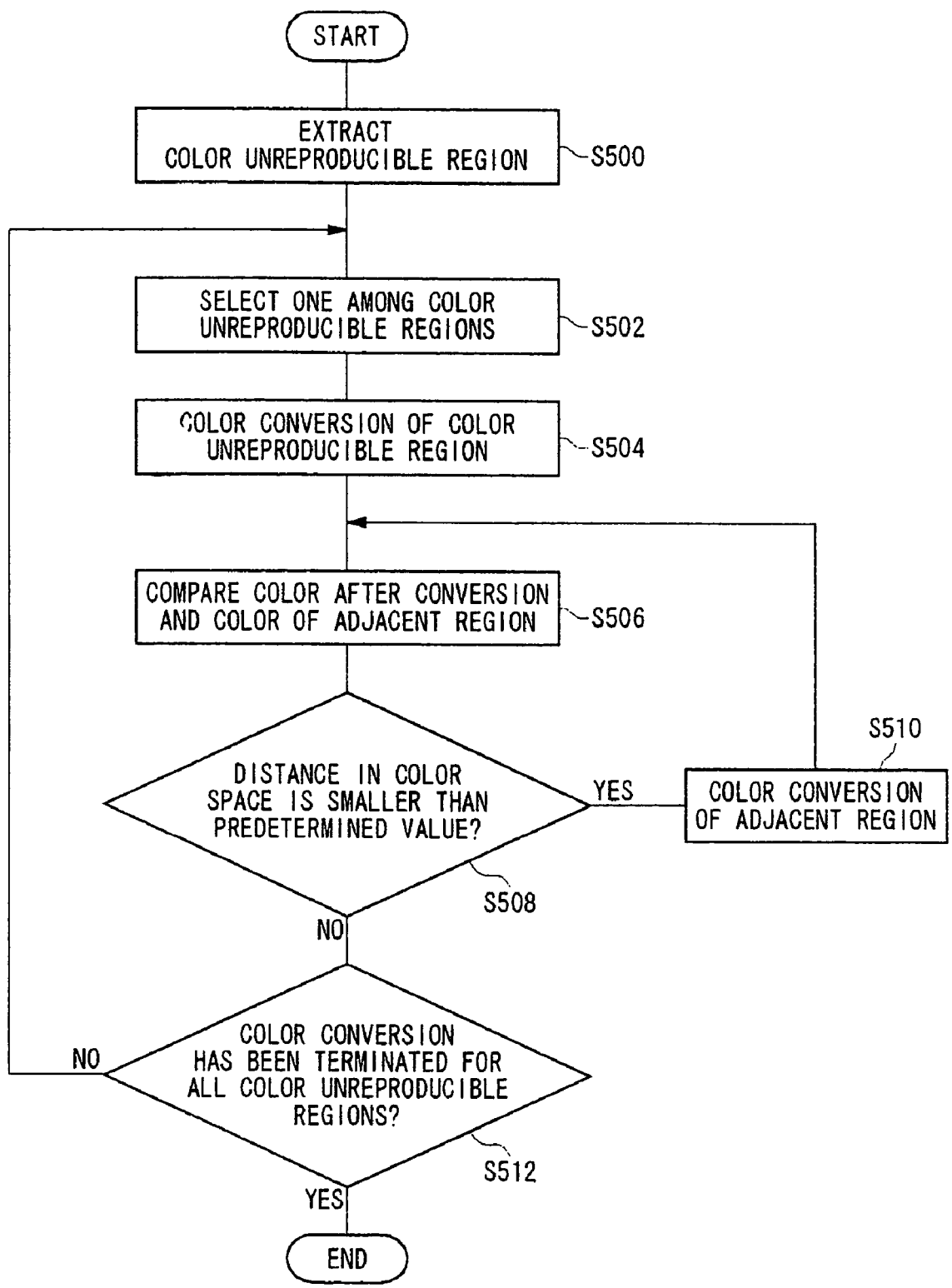
FIG. 7 is a view showing the third example of a color conversion method of an image by the output apparatus.
Figure 8:
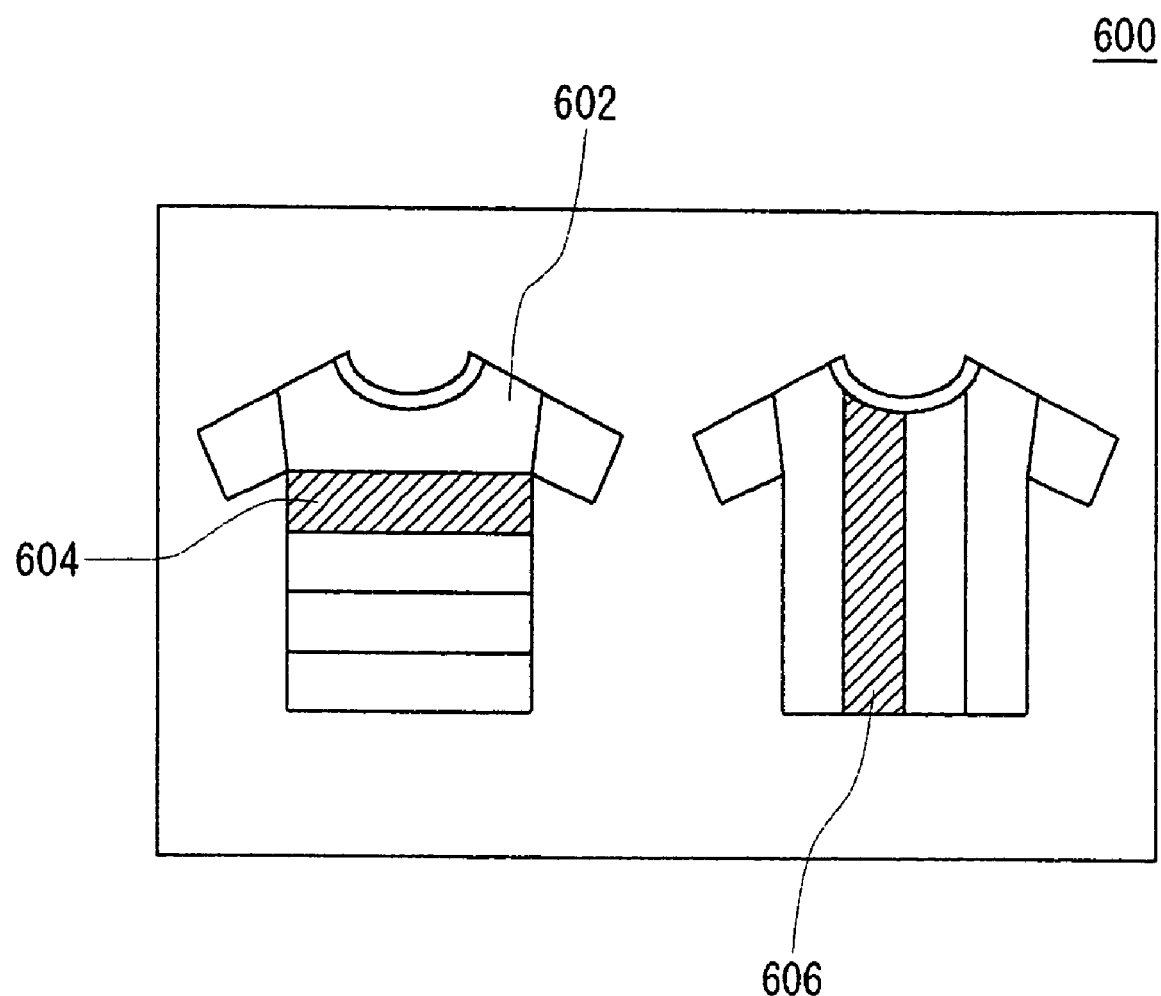
FIG. 8 is a view showing the third example of a color conversion method of an image by the output apparatus.
Figure 9:
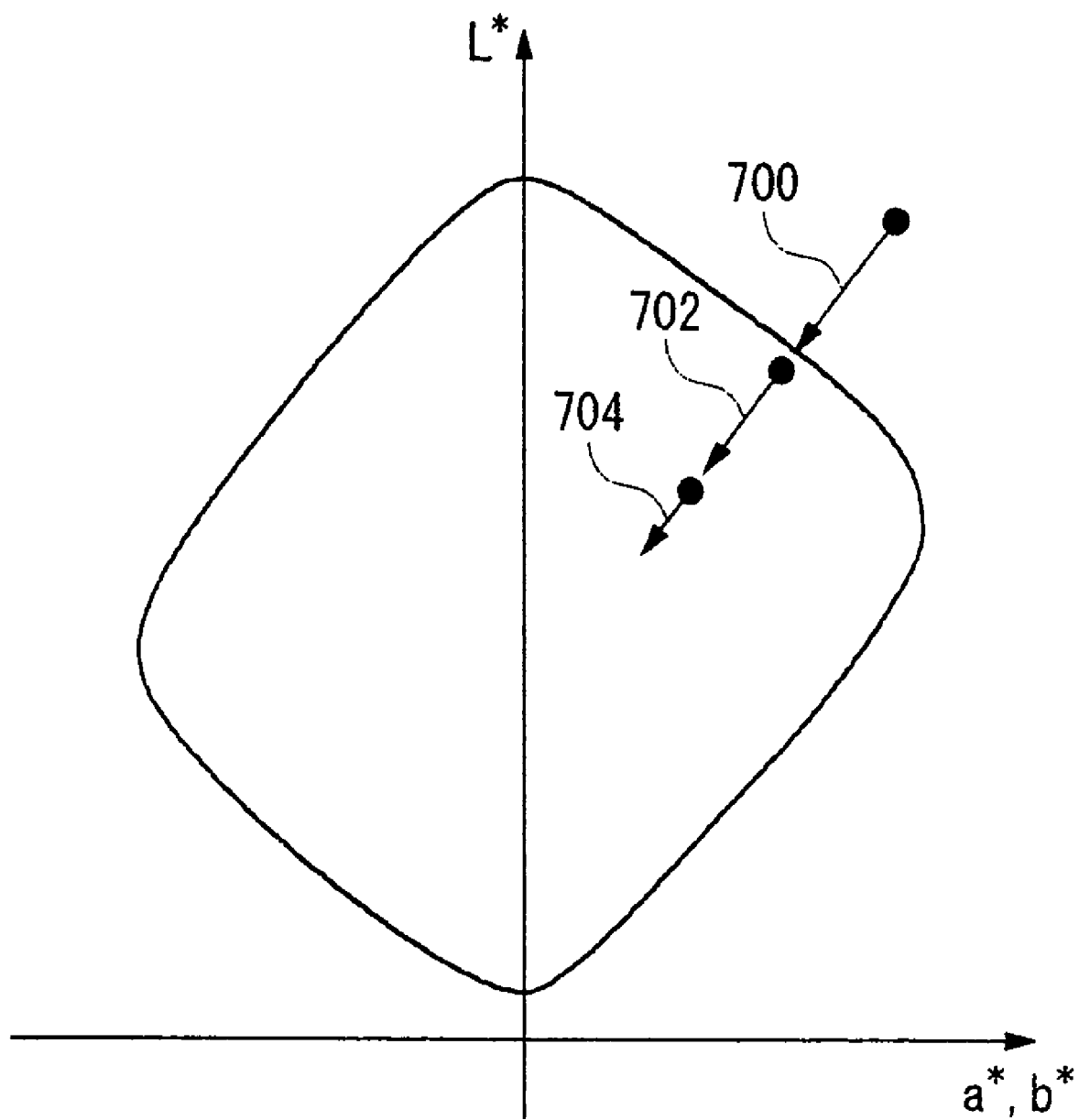
FIG. 9 is a view showing the third example of a color conversion method of an image by the output apparatus.
Figure 10:
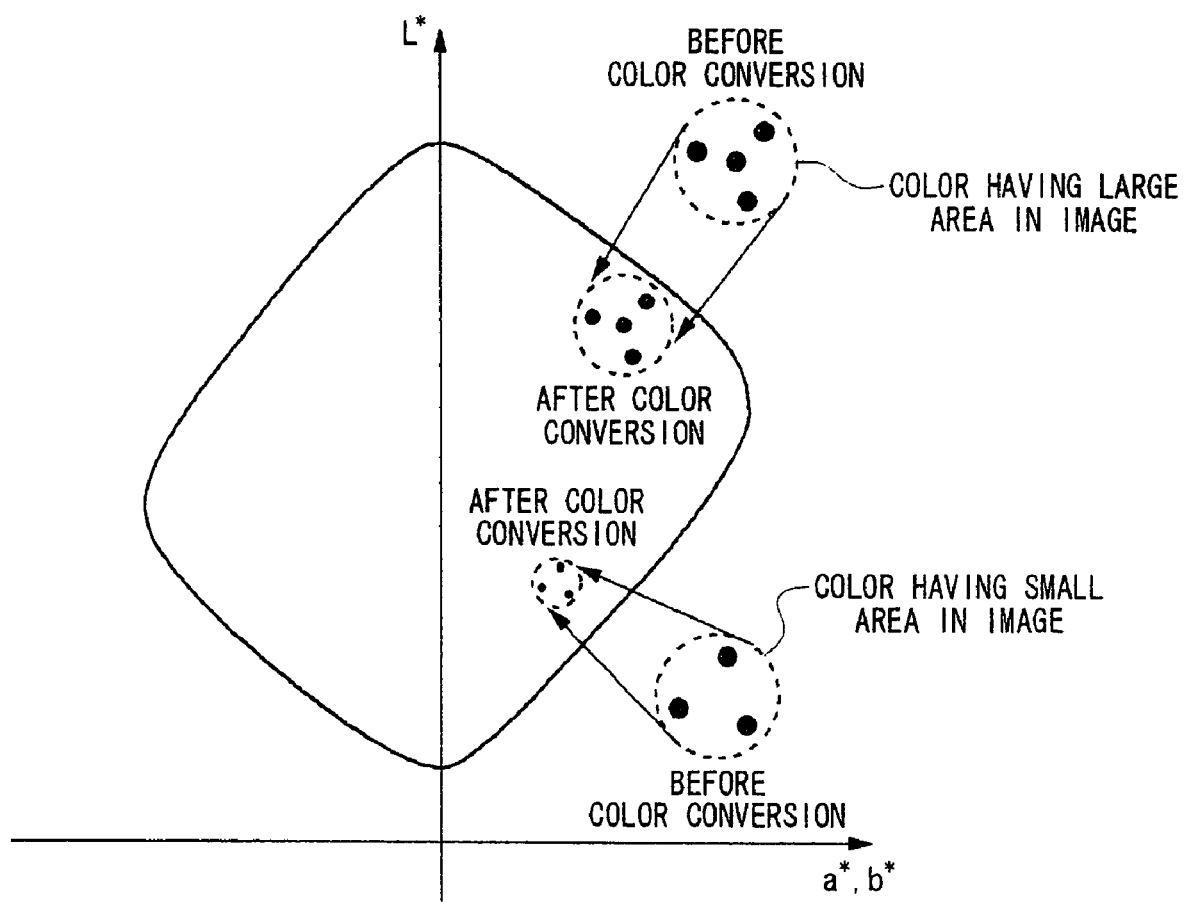
FIG. 10 is a view showing the third example of a color conversion method of an image by the output apparatus.

FIGS. 7, 8, 9, and 10 show the third example of the color conversion method of the image by the output apparatus 100 according to the present embodiment. FIG. 7 is a view exemplary showing a flow of the color conversion method according to the third example. FIG. 8 is a view exemplary showing an image according to the third example. FIGS. 9 and 10 are views exemplary showing a color space according to the third example. Hereinafter, according to the flow of the color conversion method shown in FIG. 7, the third example of the color conversion method will be explained referring to FIGS. 8, 9, and 10. In addition, except for the following description, since an operation of the output apparatus 100 according to the third example is similar to an operation of the output apparatus 100 according to the first or second example, their descriptions will be omitted.

At first, the color unreproducible region extracting unit 104 divides an image 600 input by the image inputting unit 102 into regions consisting of a single color or regions consisting of a plurality of similar colors, and extracts color unreproducible region(s) consisting of a single color capable of not being reproduced by the output apparatus 100 among the plurality of regions or color unreproducible region(s) consisting of a plurality of similar colors capable of not being reproduced by the output apparatus 100 among the plurality of regions (S500). For example, the color unreproducible region extracting unit 104 extracts the color unreproducible regions 604 and 606. Here, the plurality of similar colors is a plurality of colors existing in range of a predetermined magnitude in a color space.

Then, the first color converting unit 106 selects one among the color unreproducible regions extracted by the color unreproducible region extracting unit 104 (S502), and converts the color of the selected color unreproducible region 604 into the color capable of being reproduced by the output apparatus 100 (S504). For example, the first color converting unit 106 selects the color unreproducible region 604, and converts the color of the color unreproducible region 604 into the color capable of being reproduced by the output apparatus 100. Specifically, the first color converting unit 106 performs color conversion indicated by the first conversion vector 700 in a color space as shown in FIG. 9 with respect to the color unreproducible region 604.

Moreover, in the S504, the first color converting unit 106 converts a plurality of colors of the color unreproducible regions into the colors capable of being reproduced according to an area of the color unreproducible region 604 in the image. Specifically, as shown in FIG. 10, when an area of the color unreproducible region 604 is small, the first color converting unit 106 converts the plurality of colors of the color unreproducible region 604 so that the distance in the color space between the plurality of colors of the color unreproducible region 604 after the color conversion turns to be turns to be smaller than the distance in the color space before the color conversion.

Next, the adjacent region extracting unit 108 compares the color of the color unreproducible region that has been converted by the first color converting unit 106 with the color of the region close to the color unreproducible region in the image 600 (S506). Then, the adjacent region extracting unit 108 decides whether the distance between the color of the color unreproducible region and the color of the region close to the color unreproducible region is smaller than a predetermined value in the color space as shown in FIG. 9 (S508). For example, the adjacent region extracting unit 108 compares the color of the color unreproducible region 604 with the color of the region 602. Then, the adjacent region extracting unit 108 decides whether the distance between the color of the color unreproducible region 604 and the color of the region 602 is smaller than the predetermined value.

In the S508, when the adjacent region extracting unit 108 decides that the distance in the color space between the color of the color unreproducible region and the color of the region adjacent to the color unreproducible region is smaller than the predetermined value (S508: YES), the second color converting unit 112 converts the color of the adjacent region according to the color conversion by which the first color converting unit 106 converts the color of the color unreproducible region (S510). For example, when the distance between the color of the color unreproducible region 604 and the color of the region 602 is smaller than the predetermined value, the second color converting unit 112 converts the color of the region 602 according to the color conversion by which the first color converting unit 106 converts the color of the color unreproducible region 604.

That is, the second color converting unit 112 converts the color of the region that is a region close to the color unreproducible region in the image 600 and is a color close to the color of the color unreproducible region that has been converted by the first color converting unit 106 in the color space according to the color conversion by the first color converting unit 106. For example, the second color converting unit 112 performs color conversion indicated by a second conversion vector 702 having the same direction as the first conversion vector 700 in the color space as shown in FIG. 9 with respect to the region close to the color unreproducible region in the image 600.

Moreover, the second color converting unit 112 may respectively perform color conversion indicated by a second conversion vector having the magnitude depending on the distance from the color unreproducible region in the image 600 with respect to the region close to the color unreproducible region in the image 600. Specifically, the second color converting unit 112 performs color conversion indicated by the second conversion vector 702 having the magnitude closer to the first conversion vector 700 with respect to the region closer to the color unreproducible region in the image 600. Moreover, the second color converting unit 112 may respectively perform color conversion indicated by the second conversion vector having the magnitude depending on the distance in the color space as shown in FIG. 9 between the color of the region close to the color unreproducible region in the image 600 and the color of the color unreproducible region that has been converted by the first color converting unit 106 with respect to the region close to the color unreproducible region in the image 600. Specifically, the second color converting unit 112 performs color conversion indicated by the second conversion vector 702 having the magnitude closer to the first conversion vector 700 with respect to the region of the color closer to the color of the color unreproducible region that has been converted by the first color converting unit 106 in the color space as shown in FIG. 9, in the region close to the color unreproducible region in the image 600.

That is, the second color converting unit 112 converts the color of the region adjacent to the color unreproducible region in the image based on the distance in the color space between the color of the color unreproducible region and the color of the region adjacent to the color unreproducible region. Specifically, the second color converting unit 112 may perform color conversion closer to the color conversion performed on the color unreproducible region by the first color converting unit 106 with respect to the color of the region adjacent to the color unreproducible region when the distance in the color space between the color of the color unreproducible region and the color of the region adjacent to the color unreproducible region is small, and also perform small color conversion with respect to the regions besides the color unreproducible region when the distance in the color space between the color of the color unreproducible region and the color of the region adjacent to the color unreproducible region is large.

Then, the adjacent region extracting unit 108 compares the color of the region that has been converted by the second color converting unit 112 with the color of the region close to that region (S506). Then, the adjacent region extracting unit 108 decides whether the distance between the color of the region that has been converted by the second color converting unit 112 and the color of the region close to that region in the color space is smaller than the predetermined value (S508). Then, the second color converting unit 112 converts the color of the region close to the region that has been converted by the second color converting unit 112 in the image 600 in accordance with the color conversion of the region by the second color converting unit 112 (S510). For example, the second color converting unit 112 performs color conversion indicated by a third conversion vector 704 having the same direction as the second conversion vector 702 in the color space as shown in FIG. 9 with respect to the region close to the color unreproducible region in the image 600. Then, these steps S506 to S510 are repeatedly performed until the region converted by the second color converting unit 112 and the region close to that region have not approximate colors.

In the S508, when the adjacent region extracting unit 108 decides that the distance between the color of the color unreproducible region and the color of the region close to the color unreproducible region is smaller than the predetermined value (S508: NO), the adjacent region extracting unit 108 decides whether the color conversion has been terminated for all color unreproducible regions extracted by the color unreproducible region extracting unit 104 (S512).

In the S512, when the adjacent region extracting unit 108 decides that the color conversion has not been terminated for all color unreproducible regions (S512: NO), the first color converting unit 106 selects one among the color unreproducible regions extracted by the color unreproducible region extracting unit 104 once more to repeatedly perform the steps S502 to S512. For example, the first color converting unit 106 selects the color unreproducible region 606 to perform the color conversion, and further the second color converting unit 112 converts the color of the region that is a region close to the color unreproducible region 606 in the image 600 and is a color close to the color of the color unreproducible region 606 that has been converted by the first color converting unit 106 in the color space. On the other hand, in the S512, when the adjacent region extracting unit 108 decides that the color conversion has been terminated for all color unreproducible regions (S512: YES), this flow is finished.

As described above, since the color of the region that is a region close to the color unreproducible region in the image and is a color close to the color of the color unreproducible region in the color space is converted in accordance with the color conversion of the color unreproducible region after converting the color of the color unreproducible region into the color capable of reproduced by the output apparatus 100, it is possible to adequately hold the difference of colors even if the color unreproducible region and the region close to the color unreproducible region have approximate colors. Therefore, it is possible to output an image having high quality by a high contrast even if the colors capable of not being reproduced by the output apparatus 100 are converted into the reproducible colors.

Moreover, since the distance in the color space after the color conversion of the plurality of colors to the distance in the color space before the color conversion is changed according to an area of the color unreproducible region in the image, it is possible to hold a contrast in the color unreproducible region and perform the color conversion when converting the color of the color unreproducible region that has a large area in the image and greatly affects an impression of the image, and also possible to hold a contrast between the color unreproducible region and the region besides the color unreproducible region and perform the color conversion without holding a contrast in the color unreproducible region when converting the color of the color unreproducible region that has a small area in the image and does not particularly affect an impression of the image.

Figure 11:
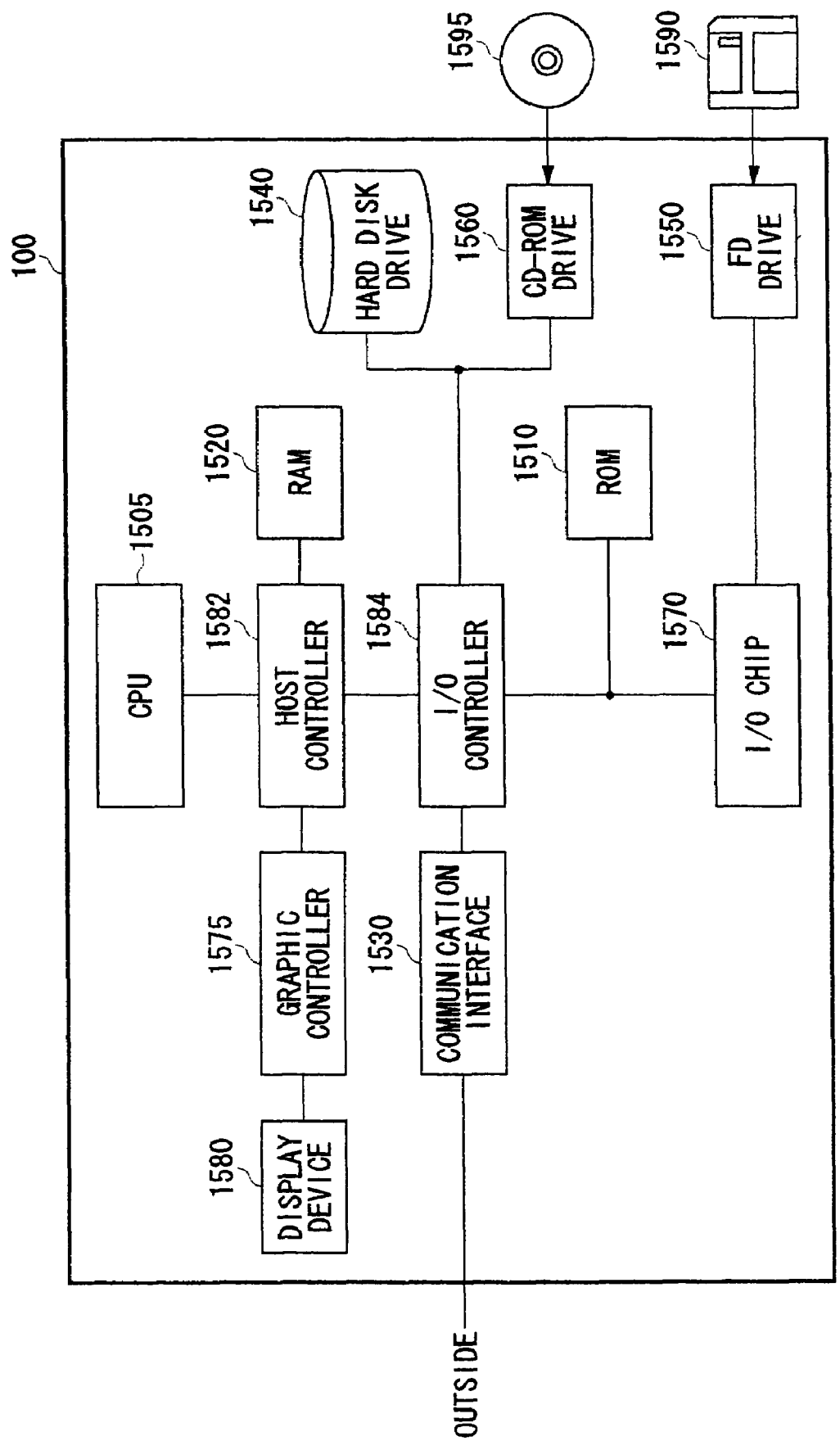
FIG. 11 is a view exemplary showing a hardware configuration of the output apparatus.

FIG. 11 is a view exemplary showing a hardware configuration of the output apparatus 100 according to the present embodiment. The output apparatus 100 includes a CPU peripheral unit having a CPU 1505, a RAM 1520, a graphic controller 1575, and a display device 1580 that are connected to one another by way of a host controller 1582, an input and output unit having a communication interface 1530, a hard disk drive 1540, and a CD-ROM drive 1560 that are connected to the host controller 1582 by way of an input and output controller 1584, and a legacy input and output unit having a ROM 1510, a flexible disc drive 1550, and an input and output chip 1570 that are connected to the input and output controller 1584.

The host controller 1582 connects the RAM 1502 to the CPU 1505 and the graphic controller 1575 that access the RAM 1520 at high transfer rate. The CPU 1505 operates based on a program stored on the ROM 1510 and the RAM 1520 to control each unit. The graphic controller 1575 acquires the image data that the CPU 1505 and so on generate on a frame buffer provided in the RAM 1520 to display it on the display device 1580. Alternatively, the graphic controller 1575 may include a frame buffer storing the image data generated by the CPU 1505 therein.

The input and output controller 1584 connects the host controller 1582 to the communication interface 1530, the hard disk drive 1540, and the CD-ROM drive 1560 that are an input and output apparatus having comparatively high speed. The communication interface 1530 communicates with other devices via a network. The hard disk drive 1540 stores a program and data to be used by the CPU 1505 within the output apparatus 100. The CD-ROM drive 1560 reads a program or data from a CD-ROM 1595, and provides it to the hard disk drive 1540 via the RAM 1520.

Moreover, an input and output apparatus having comparatively low speed such as the ROM 1510, the flexible disc drive 1550, and the input and output chip 1570 are connected to the input and output controller 1584. The ROM 1510 stores a boot program that the output apparatus 100 carries out on start-up, a program that is utterly used for a hardware of the output apparatus 100, and so on. The flexible disc drive 1550 reads the program or data from the flexible disc 1590, and provides it to the hard disk drive 1540 via the RAM 1520. The input and output chip 1570 connects various input and output apparatus via the flexible disc drive 1550 and a port such as a parallel port, a serial port, a keyboard port, and a mouse port.

A program provided to the hard disk drive 1540 via the RAM 1520 is stored on a recording medium such as the flexible disc 1590, the CD-ROM 1595 or an IC card and is provided by a user. The program is read from the recording medium, and is installed in the hard disk drive 1540 within the output apparatus 100 via the RAM 1520 to be carried out in the CPU 1505. The program installed and carried out in the output apparatus 100 causes the output apparatus 100 to function as the output apparatus 100 as described from FIGS. 1 to 10 by way of the realization of the CPU 1505.

A program as described above may be stored on outside storage media. As the storage media, an optical recording medium such as DVD or PD, a magneto-optical recording medium such as MD, a tape medium, a semiconductor memory such as an IC card, etc. can be used in addition to the flexible disc 1590, the CD-ROM 1595. Moreover, a storage device such as a hard disk or a RAM that is provided in a server system connected to a private telecommunication network and Internet may be used as a recording medium, and thus a program may be provided to the output apparatus via the network.

According to the present invention, although the unreproducible color among the colors included in an image is converted into the reproducible color, it is possible to provide an output apparatus capable of outputting an image of high quality, a color conversion method by the output apparatus, and a program used for the output apparatus.

Although the present invention has been described by of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An output apparatus that converts unreproducible colors into reproducible colors among colors included in an image to output the image, the output apparatus comprising:
   a color unreproducible region extracting unit operable to extract a color unreproducible region that is a region including a color capable of not being reproduced by the output apparatus among the colors included in the image;
   a first color converting unit operable to convert a color of the color unreproducible region into a color capable of being reproduced by the output apparatus; and
   a second color converting unit operable to convert colors of regions besides the color unreproducible region based on positional relationship in the image between the color unreproducible region and the regions besides the color unreproducible region, wherein said second color converting unit converts the colors of the regions besides the color unreproducible region based on the distance in the image to the color unreproducible region.

2. The output apparatus as claimed in claim 1, wherein said color unreproducible region extracting unit extracts the color unreproducible region that is a region including a color outside a Gamut region showing colors capable of being reproduced by the output apparatus among the colors included in the image, and
said first color converting unit converts the color of the color unreproducible region into the color within the Gamut region.

3. The output apparatus as claimed in claim 1, wherein the regions besides the color unreproducible region are spatially adjacent to the color unreproducible region.

4. The output apparatus as claimed in claim 1, wherein said second color converting unit performs color conversion closer to the color conversion performed on the color unreproducible region by means of
said first color converting unit with respect to the colors of the regions besides the color unreproducible region closer to the color unreproducible region in the image.

5. The output apparatus as claimed in claim 1, wherein said color unreproducible region extracting unit extracts a object including a color capable of not being reproduced by the output apparatus as the color unreproducible region,
said first color converting unit converts the color of the object into a reproducible color, and
said second color converting unit respectively gamma-converts colors of objects besides the object based on the distance in the image to the object.

6. The output apparatus as claimed in claim 5, wherein the object further includes a color capable of being reproduced by the output apparatus.

7. The output apparatus as claimed in claim 1, wherein said first color converting unit generates a gamma curve by which the color of the color unreproducible region is converted into the color capable of being reproduced by the output apparatus to gamma-convert the color of the color unreproducible region, and
said second color converting unit generates a plurality of gamma curves that is used for the color conversion of the regions besides the color unreproducible region to respectively gamma-convert the colors of the regions besides the color unreproducible region based on the distance in the image to the color unreproducible region.

8. The output apparatus as claimed in claim 7, wherein said second color converting unit generates the gamma curves closer to the gamma curve generated by said first color converting unit to respectively gamma-convert the colors of the regions besides the color unreproducible region with respect to the regions besides the color unreproducible region closer to the color unreproducible region in the image.

9. The output apparatus as claimed in claim 1, wherein said first color converting unit generates a lookup table by which the color of the color unreproducible region is converted into the color capable of being reproduced by the output apparatus to convert the color of the color unreproducible region, and
said second color converting unit generates a plurality of lookup tables that is used for the color conversion of the regions besides the color unreproducible region to respectively convert the colors of the regions besides the color unreproducible region based on the distances in the image between the color unreproducible region and the regions besides the color unreproducible region.

10. The output apparatus as claimed in claim 9, wherein said second color converting unit generates the lookup tables closer to the lookup table generated by said first color converting unit with respect to the regions besides the color unreproducible region closer to the color unreproducible region in the image and also generates the lookup tables having small color conversion with respect to the regions besides the color unreproducible region farther from the color unreproducible region in the image, in order to respectively convert the colors of the regions besides the color unreproducible region.

11. The output apparatus as claimed in claim 1, wherein said first color converting unit generates a color conversion matrix by which the color of the color unreproducible region is converted into the color capable of being reproduced by the output apparatus to convert the color of the color unreproducible region, and
said second color converting unit generates a plurality of color conversion matrices that is used for the color conversion of the regions besides the color unreproducible region to respectively convert the colors of the regions besides the color unreproducible region based on the distances in the image between the color unreproducible region and the regions besides the color unreproducible region.

12. The output apparatus as claimed in claim 11, wherein said second color converting unit generates the color conversion matrices closer to the color conversion matrix generated by said first color converting unit with respect to the regions besides the color unreproducible region closer to the color unreproducible region in the image and also generates the color conversion matrices having small color conversion with respect to the regions besides the color unreproducible region farther from the color unreproducible region in the image, in order to respectively convert the colors of the regions besides the color unreproducible region.

13. The output apparatus as claimed in claim 1, wherein
said color unreproducible region extracting unit extracts the color unreproducible region consisting of a single color capable of not being reproduced by the output apparatus,
said first color converting unit converts the color of the color unreproducible region into the color capable of being reproduced by the output apparatus, and
said second color converting unit converts the colors of the regions close to the color unreproducible region in the image in accordance with the color conversion by said first color converting unit.

14. The output apparatus as claimed in claim 13, wherein said second color converting unit converts the color of the region that is a region close to the color unreproducible region in the image and is a color close to the color of the color unreproducible region that has been converted by said first color converting unit in a color space in accordance with the color conversion by said first color converting unit.

15. The output apparatus as claimed in claim 14, wherein
said first color converting unit performs color conversion indicated by a first conversion vector in the color space with respect to the color unreproducible region, and
said second color converting unit performs color conversion indicated by a second conversion vector having the same direction as the first conversion vector in the color space with respect to the region close to the color unreproducible region in the image.

16. The output apparatus as claimed in claim 15, wherein said second color converting unit respectively performs color conversion indicated by the second conversion vector having the magnitude according to the distance from the color unreproducible region in the image with respect to the regions close to the color unreproducible region in the image.

17. The output apparatus as claimed in claim 16, wherein said second color converting unit performs color conversion indicated by the second conversion vector having the magnitude closer to the first conversion vector with respect to the region closer to the color unreproducible region in the image.

18. The output apparatus as claimed in claim 15, wherein said second color converting unit respectively performs color conversion indicated by the second conversion vector having the magnitude according to the distance in the color space between the color of the region close to the color unreproducible region in the image and the color of the color unreproducible region that has been converted by said first color converting unit with respect to the regions close to the color unreproducible region in the image.

19. The output apparatus as claimed in claim 18, wherein said second color converting unit respectively performs color conversion indicated by the second conversion vector having the magnitude closer to the first conversion vector with respect to the region that is close to the color unreproducible region in the image and of which a color is closer to the color of the color unreproducible region that has been converted by said first color converting unit in the color space.

20. The output apparatus as claimed in claim 13, wherein said second color converting unit converts a color of the region close to the region that has been converted by said second color converting unit in the image according to the color conversion performed on the region that has been converted by said second color converting unit.

21. The output apparatus as claimed in claim 1, wherein
said color unreproducible region extracting unit extracts the color unreproducible region consisting of a plurality of colors capable of not being reproduced by the output apparatus, and
said first color converting unit converts the plurality of colors of the color unreproducible region into reproducible colors according to an area of the color unreproducible region in the image.

22. The output apparatus as claimed in claim 21, wherein said first color converting unit converts the plurality of colors of the color unreproducible region so that the distance in the color space between the plurality of colors of the color unreproducible region after the color conversion turns to be smaller than the distance in the color space before the color conversion when an area of the color unreproducible region is small.

23. The output apparatus as claimed in claim 1, wherein said second color converting unit converts the color of the region adjacent to the color unreproducible region based on the distance in the color space between the color of the color unreproducible region and the color of the region adjacent to the color unreproducible region.

24. The output apparatus as claimed in claim 23, wherein said second color
converting unit performs color conversion closer to the color conversion performed on the color unreproducible region by said first color converting unit with respect to the color of the region adjacent to the color unreproducible region when the distance in the color space between the color of the color unreproducible region and the color of the region adjacent to the color unreproducible region is small, and also performs small color conversion with respect to the regions besides the color unreproducible region when the distance in the color space between the color of the color unreproducible region and the color of the region adjacent to the color unreproducible region is large.

25. The output apparatus as claimed in claim 1, wherein the positional relationship is spatial.

26. The output apparatus as claimed in claim 1,
wherein the color unreproducible region extracting unit is operable to further extract a plurality of color unreproducible regions, and
wherein the second color converting unit converts colors of regions besides the color unreproducible region based on a Cartesian positional relationship in the image between each of the plurality of color unreproducible regions and the regions besides the color unreproducible regions.

27. The output apparatus as claimed in claim 1, wherein the positional relationship is with respect to two-dimensional Cartesian coordinates defining the image, which is viewable.

28. The output apparatus as claimed in claim 27,
wherein the second color converting unit converts the colors of the regions besides the color unreproducible region based on a color model in a multidimensional color space.

29. The output apparatus as claimed in claim 28, wherein the color model is one of RGB and CMYK.

30. A color conversion method of converting unreproducible colors into reproducible colors among colors included in an image, the color conversion method comprising the steps of:

extracting a color unreproducible region that is a region including a color capable of not being reproduced by an output apparatus among the colors included in the image;

converting a color of the color unreproducible region into a color capable of being reproduced by the output apparatus; and converting colors of regions besides the color unreproducible region based on positional relationship in the image between the color unreproducible region and the regions besides the color unreproducible region, wherein said converting the colors of the regions besides the color unreproducible region is based on the distance in the image to the color unreproducible region.

31. A machine readable medium storing a program for an output apparatus that converts unreproducible colors into reproducible colors among colors included in an image to output the image, the program causing the output apparatus to function as:

a color unreproducible region extracting unit operable to extract a color unreproducible region that is a region including a color capable of not being reproduced by the output apparatus among the colors included in the image;

a first color converting unit operable to convert a color of the color unreproducible region into a color capable of being reproduced by the output apparatus; and a second color converting unit operable to convert colors of regions besides the color unreproducible region based on positional relationship in the image between the color unreproducible region and the regions besides the color unreproducible region, wherein said second color converting unit converts the colors of the regions besides the color unreproducible region based on the distance in the image to the color unreproducible region.

* * * * *